United States Patent [19]

Ryoke et al.

[11] Patent Number: 4,693,929

[45] Date of Patent: Sep. 15, 1987

[54] MAGNETIC RECORDING MEDIUM

[75] Inventors: Katsumi Ryoke; Masatoshi Takahashi; Takashi Yoneyama; Yasuo Nishikawa; Eiichi Tadokoro, all of Kanagawa, Japan

[73] Assignee: Fuji Photo Film Co., Ltd., Kanagawa, Japan

[21] Appl. No.: 784,425

[22] Filed: Oct. 4, 1985

[30] Foreign Application Priority Data

Oct. 4, 1984 [JP] Japan ................................ 59-208483

[51] Int. Cl.$^4$ ............................ G11B 5/70; G11B 5/71
[52] U.S. Cl. ..................................... 428/323; 427/131; 428/447; 428/694; 428/695; 428/900
[58] Field of Search ............... 428/694, 695, 900, 447, 428/323; 427/131

[56] References Cited

U.S. PATENT DOCUMENTS 3,993,824  11/1976  Shirahata et al. .................. 427/131

Primary Examiner—Paul J. Thibodeau

[57] ABSTRACT

A magnetic recording medium comprising a magnetic layer coated on one side of a non-magnetic support and a backing layer coated on the opposite side of the non-magnetic support, wherein the backing layer comprises non-magnetic particles, a binder and silicone having a viscosity of from 1 to 50 CS (centistokes) at 25° C. in an amount of from 0.01 to 3 wt. % based on the non-magnetic particles, wherein the non-magnetic particles contain carbon black in an amount of at least 50 wt. % based on the total amount of the non-magnetic particles, and wherein 25 wt. % or more of the carbon black has an average particle size of from 150 to 1,000 mµ.

23 Claims, No Drawings

MAGNETIC RECORDING MEDIUM

FIELD OF THE INVENTION

The present invention relates to a magnetic recording medium, and more particularly it relates to a magnetic recording medium having a highly sensitized magnetic recording layer (hereinafter a "magnetic layer") and a backing layer on the opposite surface of a support in order to make the magnetic layer more sensitive.

BACKGROUND OF THE INVENTION

Recently, a magentic recording medium has been required to be more sensitive. If the magnetic recording medium is made more sensitive, a high quality image as well as a good sound quality and high density recording thereof can be realized. Those improvements can be attained by improving the deck for magnetic recording and replaying and the recording system of a magnetic recording medium, and also by improving a magnetic recording medium itself.

A magnetic recording medium can be highly sensitized by increasing the signal and decreasing the noise in the signal/niose ratio thereof. The signal can be increased by increasing a residual magnetic flux density and a coercive force of the magnetic recording medium, which can be realized by making ferromagnetic particles finer or adjusting the shape of anisotropy and arrangement of a magnetic single domain of each ferromagnetic fine particle.

The noise can be decreased by various factors, for example, by smoothing the magnetic layer and controlling the charging properties of the magnetic recording medium. It has been disclosed that a backing layer can be provided in order to control the charging properties of the magnetic recording medium and maintain the running durability thereof, for example, in Japanese Patent Application (OPI) Nos. 74909/1974, 16105/1972, 75102/1974, 75103/1974, 11305/1974, 48109/1973, U.S. Pat. Nos. 3,617,378, 3,734,772, 3,196,039, 4,135,031, British Pat. No. 1,198,009, Japanese Patent Publication Nos. 2612/1965, 8321/1974, 10244/1974, 2415/1983, Japanese Patent Application (OPI) Nos. 3132/1983, 130234/1982, Japanese Patent Publication No. 3927/1975, Japanese Patent Application (OPI) Nos. 150132/1982, 123532/1982, 161135/1983, 96505/1977, and Japanese Patent Publication No. 23647/1983.

However, a magnetic recording medium having high sensitivity and sufficient running durability cannot be obtained satisfactorily by the above technology. This is because (1) although the surface properties of the magnetic recording medium can be improved by smoothing the surface thereof, and a spacing loss between the magnetic recording and replaying head and the magnetic recording medium can be reduced, the running durability thereof deteriorates and the friction coefficient increases, whereby the magnetic recording layer and the backing layer are worn out; (2) if the surface of the backing layer is made rough in order to improve the running durability of the backing layer, the rough surface of the backing layer is printed through on the magnetic layer, thereby the signal/noise ratio of the magnetic layer decreases; and (3) at an initial stage of running when the magnetic layer and the backing layer are not yet worn out, drop outs increases, thereby decreasing the signal/noise ratio.

The present inventors made thorough investigations and, as the result, have found that the drop outs occurring at the initial stage and after repeated use is caused by dust and contaminants, which are adhered on the surface of the magnetic recording medium and scrapes of the magnetic recording medium. In many of these cases, the adhesion of dust and contaminants have effect the insulating or non-insulating properties of the tape path of the magnetic tapes on the deck for magnetic recording and replaying, the running speed and the running tension of the magnetic tape. Particularly in the magnetic recording medium, the adhesion of the dust and contaminants effect the charging property, the surface electric resistance and the friction coefficient of the magnetic recording medium. By properly adjusting the hardness and toughness of the materials of which the magnetic recording medium is composed and the surface roughness of the magnetic recording medium, a magnetic recording medium having a high signal/noise ratio can be realized. Further, the surroundings are important where the magnetic recording medium is run, because they have a close and complicated relationship to the charging properties of the dust and contaminants and the temperature and humidity which effect on the charging properties thereof.

Factors affecting the increase in drop outs due to scraping of the magnetic recording medium are that the magnetic layer or the backing layer drops off as powder caused by the friction between the magnetic recording medium and the tape running path in its container or recording/replaying device and that bumps of the dust and contaminants which adhere on the tape running path scrape off the magnetic layer and the backing layer of the magnetic recording medium. In order to prevent the scraping off of the backing layer by the dust and contaminants, it is necessary that the backing layer has a thickness larger than the diameter of the bumps and that a sufficiently tough binder is well mixed and kneaded with the particles in order to prevent the peeling off of the backing layer and the magnetic layer. In order to prevent the scraping off of the backing layer by the bumps of the dust and contaminants, it is necessary that the backing layer has a thickness of from 1.0 to 3.0 $\mu$m. When the backing layer has a thickness of 1.0 $\mu$m or less, generally the dust and contaminants which are present in the air readily scrape off the backing layer in a running direction of the magnetic recordng medium, whereby scratches are made continuously in that direction and surface unevenness is generated.

SUMMARY OF THE INVENTION

An object of the present invention is to provide a magnetic recording medium containing a novel additive in a backing layer thereof to reduce drop outs and provide an excellent signal to noise ratio.

Another object of the present invention is to provide a magnetic recording medium having a backing layer of which the running properties are excellent.

Still another object of the present invention is to provide a magnetic recording medium having high sensitivity and which the surface properties are improved so that the signal to noise ratio is not affected.

The above objects can be accomplished by the present invention mentioned below.

That is, the present invention provides (1) a magnetic recording medium comprising a magnetic layer coated on one side of a non-magnetic support and a backing layer coated on the opposite side of the non-magnetic support, wherein the backing layer comprises non-magnetic particles, a binder and a silicone having a viscosity of from 1 to 50 CS (centistokes) at 25° C. in an amount of from 0.01 to 3 wt.% based on the non-magnetic particles, wherein the non-magnetic particles contain carbon black in amount of at least 50 wt.% based on the total amount of the non-magnetic particles, and wherein 25 wt.% or more of the carbon black has an average particle size of from 150 to 1,000 m$\mu$; and (2) a magnetic recording medium as described above wherein the dry thickness of the backing layer is from 1.5 to 2.5 $\mu$m.

DETAILED DESCRIPTION OF THE INVENTION

Silicone used in the backing layer of the present invention is polysiloxane having a viscosity of from 1 to 50 CS, preferably from 5 to 40 CS at 25° C., a specific gravity of 0.965 or less, preferably from 0.900 to 0.965 at 25° C. and a refractive index of 1.403 or less, preferably from 1.390 to 1.403 at 25° C. The silicone used in the backing layer of the present invention is a linear or a cyclic dimethyl polysiloxane, methyl phenyl polysiloxane, diphenyl siloxane, dialkyl polysiloxane or the derivatives (modified products) thereof having a moleclar weight Mn of 4,000 or less, preferably from 500 to 4,000. These compounds are available under the trade names of, for example, "KF96L-1.0", "KF96L-1.5", KF96L-2.0", "KF96-10", "KF96-20", "KF96-30", "KF96-50", "KF96", "KP-354", "KP301", KP310", "KP320", "KP321", "KP330", "KP331", and "KP340" manufactured by Shin-Etsu Chemical Co., Ltd., "TES451" (10 CS, 20 CS, 30 CS and 50 CS), "TSF400", "TSF401", "YF3858" and "YF3859" manufactured by Toshiba Silicone Co., Ltd.

The amount of the silicone added in the backing layer of the present invention is from 0.01 to 3 wt.% based on the non-magnetic particles of the backing layer, and 3.33 wt.% or less based on the total solid content of the backing layer. The most preferred amount of the additive silicone of the present invention is from 0.01 to 2 wt.% based on the non-magnetic particles in the backing layer and 1.33 wt.% or less based on the total solid content in the backing layer.

The particle size of the carbon black as non-magnetic particles used in the backing layer of the present invention is not particularly limited. However, M.T. (Medium Thermal), F.T. (Fine Thermal), furnace carbon corresponding to M.T. or F.T., SRF, GPF, FEF, MFA, HAF, etc., which are the classes defined in the trade of the carbon black, are preferably used.

Examples of commercially available carbon black include those under the trade names of "Asahi Thermal" manufactured by Asahi Carbon Co., Ltd., "HTC #20" manufactured by Nittetsu Kagaku Co., Ltd., "Sevacarb MT" manufactured by Sevalco, "Huber N900" manufactured by Huber Co., "Raven MTP" manufactured by Columbian Co., Ltd., "Thermax P-33", "Asahi #35", "Asahi #50", "Asahi #55", "Asahi #60", "Asahi #60H", "Asahi #70" manufactured by Asahi Carbon Co., Ltd., and the like. It is desirable that these carbon black is used in an amount of 50 wt.% or more based on the non-magnetic particles in the backing layer. The average particle size of the carbon black in the backing layer is preferably from 20 to 1,000 m$\mu$. Since carbon black having a particle size of 20 m$\mu$ or less cannot improve the scratch resistance of the backing layer, since this carbon black is used in an amount of 30 wt.% or less based on the total amount of carbon black, if desired. For the same resons, carbon black having a particle size of from 150 to 1,000 m$\mu$, preferably from 150 to 500 m$\mu$ can improve the scratch resistance of the backing layer and is preferably used in an amount of at least 25 wt.%, more preferably at least 50 wt.% based on the total amount of the carbon black. The weight ratio of the non-magnetic particles/the binder is preferably from 300/100 to 40/100, more preferably from 200/100 to 50/100, although the required amount of the binder depends upon the specific serface area of the non-magnetic particles.

In addition to carbon black, other non-magnetic particles can be used in the backing layer, which include graphite, manganese oxide, tungsten disulfide, silica aerogel, anhydrous alumina fine particles, kaolinite, white lead, zinc white, lithopone, titanium white, barite particles, precipitated barium sulfate, lime stone particles, precipitated lime carbonate, chalk, talc, molybdenum disulfide, carbon fluoride, and the like. The particle size thereof is preferably about 10 $\mu$m or less, more preferably about from 0.5 to 0.001 $\mu$m.

The binder used in the backing layer of the present invention includes conventional thermoplastic resins, thermosetting resins, reactive type resins or mixtures thereof. The binder preferably contains 20 wt.% or more of at least an epoxy resin or a urethane resin and more preferably contains mainly polyurethane or only polyurethane.

The backing layer has a dry thickness of from 1.0 to 5.0 $\mu$m, preferably from 1.5 to 2.5 $\mu$m. Examples of these resins are disclosed in Japanese Patent Publication No. 2613/1965, Japanese Patent Application (OPI) No. 11305/1974, Japanese Patent Publication No. 8321/1974, Japanese Patent Application (OPI) No. 17203/1974, Japanese Patent Publication No. 10241/1974, Japanese Patent Application (OPI) No. 75103/1974, etc.

The backing layer is disclosed in, for example, U.S. Pat. Nos. 2,804,401, 3,293,066, 3,617,378, 3,062,676, 3,734,722, 3,476,596, 2,643,048, 2,803,556, 2,887,462, 2,923,642, 2,997,451, 3,007,892, 3,041,196, 3,115,420, 3,166,688, 4,310,599, 4,411,953, 4,414,270, etc.

Thermoplastic resins having a softening temperature of 150° C. or less, an average molecular weight of from 10,000 to 20,000 and a degree of polymerization of about from 200 to 2000 are used, such as a copolymer of vinyl chloride and vinyl acetate, a copolymer of vinyl chloride and vinylidene chloride, a copolymer of vinyl chloride and acrylonitrile, a copolymer of acrylic ester and acrylonitrile, a copolymer of acrylic ester and vinylidene chloride, a copolymer of acrylic ester and styrene, a copolymer of methacrylic ester and acrylonitrile, a copolymer of methacrylic ester and vinylidene chloride, a copolymer of methacrylic ester and styrene, urethane elastomer, polyvinyl fluoride, a copolymer of vinylidene chloride and acrylonitrile, a copolymer of butadiene and acrylonitrile, a polyamide resine, polyvinylbutyral, cellulose derivatives (cellulose acetate butyrate, cellulose diacetate, cellulose triacetate, nitrocellulose, etc.), a copolymer of styrene and butadiene, a polyester resin, a copolymer of chlorovinyl ether and acrylic ester, and amino resin, various synthetic rubber type thermoplastic resins, mixtures thereof, and the like. Specific examples thereof are disclosed in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, Japanese Patent Application (OPI) No. 222433/1983, U.S. Pat. Nos. 3,144,352, 3,419,420, 3,499,789, 3,713,887, 4,431,700, 4,428,974, 4,429,017 and 4,431,712.

The thermosetting resins or the reactive type resins used herein have a molecular weight of 200,000 or less in a state of a coating composition, and the molecular weight thereof becomes infinite by a condensation or addition reaction thereof while the coating composition is coated and dried. Of these resins, those which do not soften nor melt until the resins are heat-decomposed are preferred. Specific examples of those resins include a phenol resin, an epoxy resin, a polyurethane hardened resin, a urea resin, a melamine resin, an alkyd resin, a silicone resin, an acrylic reactive type resin, a mixture of a high molecular weight polyester resin and an isocyanate prepolymer, a mixture of a copolymer of methacrylate and diisocyanate prepolymer, a mixture of polyester polyol and polyisocyanate, a urea formaldehyde resin, a mixture of a low molecular weight glycol, a high molecular weight diol and triphenylmethane triisocyanate, a polyamine resin and a mixture thereof.

Specific examples thereof are disclosed in Japanese Patent Publication Nos. 8103/1964, 9779/1965, 7192/1966, 8016/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, U.S. Pat. Nos. 3,144,343, 3,320,090, 3,437,510, 3,597,273, 3,781,210, and 3,781,211.

The above-described binders are used alone or in combination and the other additives can be added thereto. The binders are used in an amount of from 33 to 250 parts by weight per 100 parts by weight of the non-magnetic particles.

The dispersing agents in the backing layer of the present invention include a fatty acid having 12 to 18 carbon atoms ($R_1COOH$, wherein $R_1$ is an alkyl group having 11 to 17 carbon atoms) such as caprylic acid, capric acid, lauric acid, myristic acid, palmitic acid, stearic acid, oleic acid, elaidic acid, linoleic acid or stearol acid; a metal soap comprised of an alkali metal (Li, Na, K) and the above fatty acid or of an alkaline earth metal (Mg, Ca), Ba, Cu and the above fatty acid; lecithin; etc. A higher alcohols having 12 or more of carbon atoms and a sulfuric ester thereof can be also used. These dispersing agents can be used in an amount of from 0.05 to 20 parts by weight per 100 parts by weight of the binder.

The specific examples are disclosed in Japanese Patent Publication Nos. 28369/1964, 17945/1969, 15001/1973, U.S. Pat. Nos. 3,387,993 and 3,470,021.

The lubricating agents used in the backing layer of the present invention include a fatty acid ester comprised of a monobasic fatty acid having 12 to 16 carbon atoms and monohydric alcohol having 3 to 12 carbon atoms and a fatty acid ester comprised of monobasic fatty acid having 17 or more of carbon atoms and a monohydric alcohol where the fatty acid ester has the total carbon atoms 21 to 23. These lubricating agents can be used in an amount of from 0.05 to 20 parts by weight, preferably from 1.0 to 5 parts by weight per 100 parts by weight of the binder. These lubricating agents are disclosed in Japanese Patent Publicastion No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539, 3,687,752, "IBM Technical Disclosure Bulletin", 9(7), 779 (December 1966) and "ELECTRONIK", 12, 380 (1961).

The abrasive agents used in the backing layer of the present invention include those generally used such as iron oxide, silicone nitride, molybdenum carbide, boron carbide, tungsten carbide, titanium carbide, fused alumina, silicon carbide, chromium oxide, corundum, artificial corundum, diamond, artificial diamomd, garnet or emery (mainly composed of corundum and magnetite). An average particle size of those abrasive agents is preferably from 0.05 to 5 $\mu$m, more preferably from 0.1 to 2 $\mu$m. Those abrasive agents are preferably used in an amount of from 0.01 to 10 parts by weight, more preferably from 0.1 to 8 parts by weight per 100 parts by weight of the binder. These abrasive agents are disclosed in Japanese Patent Application No. 26749/1973, U.S. Pat. Nos. 3,007,807, 3,041,196, 3,293,066, 3,630,910, 3,687,725, British Pat. Nos. 1,145,394 and West German Patent (DT-PS) 853211.

To prepare the coating composition for the backing layer of the present invention, the non-magnetic particles such as carbon black, the above-described binders, the dispersing agents, the lubricating agents, the abrasive agents, the antistatic agents and the solvents are mixed and kneaded to prepare the coating composition for the backing layer. The above components are introduced simultaneously or one after another into a mixing and kneading device. For example, the non-magnetic particles are added into the solvent containing the dispersing agent, and they are mixed and kneaded for a predetermined period of time. Thereafter the rest of the composition is added thereto, and mixed and kneaded to prepare the coating composition for the backing layer.

Various mixing and kneading devices are used for mixing and dispersing the coating composition, such as a two-roll mill, a three-roll mill, a ball mill, a pebble mill, a trommel, a sand grinder, Szegvari Attritor, a high speed impellor dispersing device, high speed stone mill, a high speed impact mill, a disper, a kneader, a high speed mixer, a homogenizer, an ultrasonic dispersing device or the like.

The technique for mixing, kneading and dispersing is disclosed in "Paint Flow and Pigment Dispersion", by T. C. Patton (1964, John Wiley & Sons), and U.S. Pat. Nos. 2,581,414 and 2,855,156.

The method for coating the backing layer on the support includes an air doctor coating method, a blade coating method, an air knife coating method, a squeeze coating method, a dip coating method, a reverse roll coating, a transfer roll coating method, a gravure coating method, a kiss coating method, a cast coating method, a spray coating method, and a method like the above. These coating methods are disclosed in more detail in "Coating Kogaku (Coating Engineering)", page 253 to 277, published by Asakura Shoten, Japan, on Mar. 20, 1971.

The organic solvents used for coating the backing layer include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or monoethyl ether of glycol acetate; glycol ethers such as ether, glycol dimethyl ether, glocol monomethyl ether or dioxane; tars (aromatic hydrocarbons) such as benzene, toluene or xylene; and hydrocarbon chlorides such as methylene chloride, ethylene chloride, carbon tetrachloride, chloroform, ethylene chlorohydrin or dichlorobenzene.

The ferromagnetic particles used in the magnetic layer of the present invention include barium ferrite, $\gamma$-$Fe_2O_3$, Co-containing $\gamma$-$Fe_2O_3$, $Fe_3O_4$, Co-containing $Fe_3O_4$, Co-containing $FeO_x$, $CrO_2$, Fe-Co alloy, Co-Ni-P alloy, and Co-Ni-Fe alloy. Specific examples thereof are disclosed in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, Japanese Patent Application (OPI) Nos. 96532/1984 and 94231/1984.

A method for preparing a magnetic recording medium using the above described ferromagnetic particles, the additives and the support is disclosed in Japanese Patent Publication Nos. 186/1968, 28043/1972, 28054/1972, 28046/1972, 28048/1972, 31445/1972, 26890/1981 and 23647/1983.

The non-magnetic plastic supports used in the present invention include polyesters such as polyethylene terephthalate or polyethylene-2,6-naphthalate; polyolefines such as polypropylene; cellulose derivatives such as cellulose triacetate or cellulose diacetate; and the other plastics such as polycarbonate. The support has a thickness of from 3 to 100 $\mu$m, preferably from 4 to 50 $\mu$m. If it is more than the upper limit, the magnetic recording medium has too much volume, and if it is less than the lower limit, the mechanical strength thereof decreases, thereby reducing the running properties thereof and causing jitter. The thickness of the magnetic layer is from 0.5 to 10 $\mu$m, preferably 1 to 6 $\mu$m. If it is more than the upper limit, the sensitivity at recording short wave length readily decreases, and if it is less than the lower limit, the sensitivity at recording long wavelength readily decreases.

The shape of the support can be a tape, a sheet, a card, a disc, a drum or the like and the materials for the support can be selected depending upon the shape thereof.

The magnetic recording medium of the present invention can be prepared in accordance with the method as disclosed in Japanese Ptent Application (OPI) No. 108804/1977.

The present invention is further illustrated in more detail by the following Examples. It will be understood by those skilled in this art that materials, quantities and the order of operations can be changed so long as the gist of the present invention is not essentially changed. Accordingly the present invention is not limited to the following Examples. In the Examples, all parts are by weight.

EXAMPLE 1

The following composition was introduced into a ball mill, then mixed and kneaded sufficiently. Thereafter 15 parts of "Desmodur L-75" (a trade name of a polyisocyanate compound, manufactured by Bayer AG) was added thereto and they were mixed, kneaded and dispersed homogeneously to obtain a magnetic coating composition.

| | |
|---|---|
| Co-containing $\gamma$-$Fe_2O_3$ particles (Specific surface area measured by nitrogen absorption method: 35 $m^2$/g, Hc = 650 Oe) | 300 parts |
| Vinyl chloride-vinyl acetate copolymer ("VMCH", a trade name, manufactured by Union Carbide Co.) | 20 parts |
| Nitrocellulose | 5 parts |
| Polyurethane ("Nipporan N2304", a trade name, manufactured by Nippon Polyurethane Co., Ltd.) | 15 parts |
| Vinylidene chloride ("Saran", a trade name, manufactured by Asahi-Dow Ltd.) | 5 parts |
| Carbon black (Average particle size: 20 m$\mu$) | 15 parts |
| Chromium oxide (Average particle size: 0.3 $\mu$m) | 10 parts |
| Lecithin | 3 parts |
| Oleic acid | 2 parts |
| Octyl laurate | 2 parts |
| Lauric acid | 3 parts |
| Lauryl alcohol | 1.5 parts |
| Butyl acetate | 330 parts |
| Methyl ethyl ketone | 660 parts |

The above coating composition was coated on a polyethylene terephthalate support and dried to a thickness of 5.0 $\mu$m. The following composition for a backing layer was mixed and kneaded in a ball mill and thereafter 10 parts of "Desmodur L-75" (a trade name of a polyisocyanate compound, manufactured by Bayer AG) was added thereto, and they were mixed and dispersed homogeneously and were coated on the opposite surface of the polyester support to the magnetic layer in a thickness of 1.0, 1.5, 2.0 and 2.5 $\mu$m respectively.

| | |
|---|---|
| Carbon black ("Leben MTP", a trade name, average particle size: 250 m$\mu$) | 100 parts |
| Phenoxy resin ("PKHH", a trade name, manufactured by Union Carbide Co.) | 5 parts |
| Polyurethane ("Nippollan-2304", a trade name, manufactured by Nippon Polyurethane Co., Ltd.) | 30 parts |
| Saran resin (manufactured by Dow-Chemical Co., Ltd.) | 5 parts |
| Silicone ("KF96 (10CS)", a trade name, manufactured by Shin-Etsu Chemical Co., Ltd.) | Amount shown in Table 1 |
| Methyl ethyl ketone | 700 parts |
| Cyclohexanone | 100 parts |

The resulting tapes were subjected to calender treatment for smoothing the surface thereof and were slit to a width of 1 inch to obtain samples. These samples were identified as Samples Nos. 1 to 24.

Regarding these tapes, unevenness of the backing layer, scratches of the backing layer, and a number of drop outs and RF output after repeated use for 50 passes were measured. The results are shown in Table 1.

Unevenness formed by scratches on the backing layer of the tape of 10 min. length which had been repeatedly played-rewound for 50 passes on a deck was measured and evaluated based on the following three grades.

A: No unevenness
B: Unevenness on 2 or 3 places
C: Unevenness on 3 places or more The number of drop outs and RF output after repeated use for 50 passes were also shown. The drop outs value is defined in terms of the number of occurrences of drop outs for 5 $\mu$sec. or more per 10 min. measured by a drop out counter, where the reproduced output was decreased by 16 dB or more.

The RF output is defined by a relative value of dB when recording and replaying was conducted at 4 MHz.

TABLE 1

| Sample No. | Silicone (parts) | Thickness of backing layer (μm) | Unevenness on backing layer | Number of drop out | RF output |
|---|---|---|---|---|---|
| 1 | 0.0 | 1.0 | C | 1,000< | 0 (standard) |
| 2 | 0.0 | 1.5 | B | 130 | −1.5 |
| 3 | 0.0 | 2.0 | A | 120 | −3.0 |
| 4 | 0.0 | 2.5 | A | 120 | −3.4 |
| 5 | 0.01 | 1.0 | B | 200 | +1.1 |
| 6 | 0.01 | 1.5 | B | 100 | +1.5 |
| 7 | 0.01 | 2.0 | A | 90 | +0 |
| 8 | 0.01 | 2.5 | A | 90 | −0.5 |
| 9 | 0.05 | 1.0 | B | 200 | +1.5 |
| 10 | 0.05 | 1.5 | A | 80 | +1.8 |
| 11 | 0.05 | 2.0 | A | 90 | +2.0 |
| 12 | 0.05 | 2.5 | A | 80 | +2.3 |
| 13 | 0.25 | 1.0 | B | 230 | +1.6 |
| 14 | 0.25 | 1.5 | A | 100 | +1.8 |
| 15 | 0.25 | 2.0 | A | 110 | +2.0 |
| 16 | 0.25 | 2.5 | A | 110 | +1.9 |
| 17 | 1.0 | 1.0 | B | 180 | +2.1 |
| 18 | 1.0 | 1.5 | A | 110 | +1.8 |
| 19 | 1.0 | 2.0 | A | 130 | +1.9 |
| 20 | 1.0 | 2.5 | A | 130 | +2.0 |
| 21 | 5.0 | 1.0 | C | 1,000< | −4.0> |
| 22 | 5.0 | 1.5 | C | 1,000< | −4.0> |
| 23 | 5.0 | 2.0 | C | 1,000< | −4.0> |
| 24 | 5.0 | 2.5 | C | 1,000< | −4.0> |

Note:
Sample Nos. 5 to 20 are Examples of the present invention and the others are Comparative Examples.

EXAMPLE 2

The following composition was introduced into a ball mill, then mixed and kneaded sufficiently. Thereafter 20 parts of "Desmodur L-75" (trade name of a polyisocyanate compound manufactured by Bayer AG) were added thereto and they were mixed and dispersed homogeneously to prepare a magnetic coating composition.

| | |
|---|---|
| Co-containing γ-Fe$_2$O$_3$ particles (Specific surface area measured by nitrogen absorption method: 35 m$^2$, Hc = 800 Oe) | 300 parts |
| Vinyl chloride-vinyl acetate-vinylalcohol terpolymer (87:5:8) (polymerization degree: about 400) | 40 parts |
| Epoxy resin (Epoxy group content: 0.56) | 10 parts |
| Carbon black (Average particle size: 90 mμ) | 20 parts |
| Chromium oxide | 3 parts |
| Copper oleate | 1 parts |
| Octyl laurate | 3 parts |
| Lauric acid | 4.5 parts |
| Butyl acetate | 330 parts |
| Methyl isobutyl ketone | 660 parts |

The above magnetic coating composition was coated on a polyester support film and dried to a thickness of 5.0 μm. The following composition for the backing layer was prepared in a ball mill and 10 parts of "Coronate 3040" (a trade name, manufactured by Nippon Polyurethane Co., Ltd.) were added thereto and they were coated on the opposite surface of the non-magnetic support to the magnetic layer in 2 μm thickness.

| | |
|---|---|
| Carbon black ("Asahi carbon #60H", a trade name, manufactured by Asahi Carbon Co., Ltd., Average particle size: 35 μm) | 50 parts |
| Carbon black ("Raven MTP", a trade name, Average particle size: 250 mμ) | 50 parts |
| Calcium carbonate ("Homocal D", a trade name, manufactured by Shiraishi Kogyo Co., Ltd., Average particle size: 0.5 μm) | 50 parts |
| Graphite ("Sbet 200 m$^2$/g", a trade name, manufactured by Nippon Kokuen Co., Ltd., Average particle size: 0.5 μm) | 50 parts |
| Polyurethane ("Nipporan-2301", a trade name, manufactured by Nippon Polyurethane Co., Ltd.) | 50 parts |
| Saran resin (manufactured by Asahi Dow Chemical Co., Ltd.) | 25 parts |
| Silicone ("KF96 (10CS)", a trade name, manufactured by Shin-Etsu Chemical Co., Ltd.) | 0.4 part |
| Methyl ethyl ketone | 1050 parts |
| Toluene | 100 Parts |
| Cyclohexanone | 50 parts |

The resulting tape was subjected to calender treatment for smoothing the surface thereof and slit to a width of 1 inch to obtain Sample No. 25.

EXAMPLE 3

The same procedures as in Example 2 were repeated except that 0.4 part of silicone "KF69" a trade name, manufactured by Shin-Etsu Chemical Co., Ltd. was used instead of "KF-96 (10CS)" in the composition for the backing layer to obtain Sample No. 26.

EXAMPLE 4

The same procedures as in Example 2 were repeated except that the coating composition without silicone for the backing layer was dispersed and thereafter 0.4 part of silicone "KF96 (10CS)" was added at the time of adding "Coronate 3040" to obtain Sample No. 27.

COMPARATIVE EXAMPLE 1

The same procedures as in Example 2 were repeated except that 0.4 part of silicone "KF96-0.65 CS" (a trade name, manufactured by Shin-Etsu Chemical Co., Ltd.) was used instead of silicone "KF96 (10 CS)" in the composition for the backing layer to obtain Sample No. 28.

COMPARATIVE EXAMPLE 2

The same procedures as in Example 2 were repeated except that 0.4 part of silicone "KF96 (100 CS)" (a trade name, manufactured by Shin-Etsu Chemical Co., Ltd.) was used instead of silicone "KF96 (10 CS)" in the composition for the backing layer to obtain Sample No. 29.

COMPARATIVE EXAMPLE 3

The same procedures as in Example 2 were repeated except that 0.4 part of silicone "KF96 (10000CS)" (a trade name, manufactured by Shin-Etsu Chemical Co., Ltd.) was used instead of silicone "KF96 (10CS)" in the composition for the backing layer to obtain Sample No. 30.

COMPARATIVE EXAMPLE 4

The same procedures as Example 2 were repeated except that the coating composition for the backing layer without silicone was used to prepare Sample No. 31.

The sample tapes were measured and evaluated in the same manner as in Example 1. The results are shown in Table 2. When a silicone having a high viscosity is used, the coated layer becomes brittle and unevenness made by scratches easily occurs. A silicone having a low viscosity and a low boiling point is not effective because it easily evaporates while the backing layer is dried.

TABLE 2

| Sample No. | Kind of Silicone | Viscosity (at 25° C.) (CS) | Unevenness on backing layer | Drop out number |
|---|---|---|---|---|
| 25 | KF96-10 | 10 | A | 67 |
| 26 | KF96 | 20 | A | 51 |
| 27 | KF96-10* | 10 | A | 56 |
| 28 | KF96-0.65 | 0.65 | C | 200 |
| 29 | KF96-100 | 100 | C | 420 |
| 30 | KF96-10000 | 10,000 | C | 750 |
| 31 | none | — | C | 190 |

Note:
*Silicone was added when the hardening agent was added.
Sample Nos. 25 to 27 are Examples of the present invention and the others are Comparative Examples.

EXAMPLE 5

A magnetic layer was coated on a non-magnetic support in the same manner as in Example 2, and the following composition for a backing layer was prepared in a ball mill and was coated on the opposite side of the non-magnetic support to the magnetic layer in 2 μm thickness.

| | |
|---|---|
| Carbon black ("Raven MTP", a trade name, Average particle size: 250 mμ) | Amount shown in Table 3 |
| Carbon black ("Asahi #70", a trade name, Average particle size: 20 mμ) | Amount shown in Table 3 |
| Barium sulfate ("BF-1L", a trade name, manufactured by Sakai Chemical Co., Ltd., Average particle size: 0.1 μm) | 50 parts |
| Polyurethane ("Pandex T-5102S", ($M_w$ = 100,000), a trade name, manufactured by Dainippon Ink and Chemicals, Inc.) | 50 parts |
| Saran resin (manufactured by Dow Chemical Co., Ltd.) | 25 parts |
| Polyisocyanate ("Desmodur L-75") | 10 parts |
| Silicone ("KF69", a trade name, manufactured by Shin-Etsu Chemical Co., Ltd.) | 2.5 parts |
| Methyl ethyl ketone | 1500 parts |
| Cyclohexanone | 200 parts |

The resulting magnetic recording tape was slit to a width of 1 inch in the same manner as in Example 2 to obtain Samples Nos. 32 to 36. The characteristics of these samples were measured in the same manner as in Example 1. The results are shown in Table 3.

TABLE 3

| Sample No. | Carbon black (Raven) (parts) | Carbon black (Asahi) (parts) | Unevenness on backing layer | Number of drop out (dB) | RF output |
|---|---|---|---|---|---|
| 32 | 100 | 0 | A | 110 | 0 (standard) |
| 33 | 50 | 50 | A | 100 | +0.3 |
| 34 | 30 | 70 | A | 110 | +0.5 |
| 35 | 10 | 90 | B | 150 | +0.4 |
| 36 | 0 | 100 | C | 330 | −1.3 |

Note:
Sample Nos. 32 to 34 are Examples of the present invention and the others are Comparative Examples.

It is clear from the above results that the running durability of the backing layer is remarkably improved by using a carbon black having a particle size of from 150 to 1,000 mμ and a silicone having a low viscosity in a slight amount. And particularly, a signal ommission for about 1/10H (5 μsec), which is a serious defect for a high sensitive and high quality tape, is remarkably improved by above procedure.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a magnetic layer coated on one side of a non-magnetic support, the magnetic layer comprising ferromagnetic particles dispersed in a binder, with a backing layer coated on the opposite side of the non-magnetic support, wherein the backing layer comprises non-magnetic particles, a binder and silicone which has:
   (i) a viscosity of from 1 to 50 CS (centisokes) at 25° C.;
   (ii) a refractive index of 1.403 or less at 25° C. and a specific gravity of 0.965 or less at 25° C.; and
   which is used in an amount of from 0.01 to 3 wt.% based on the non-magnetic particles;
   wherein the non-magnetic particles contain carbon black in an amount of at least 50 wt.% based on the total amount of the non-magnetic particles, and wherein 25 wt.% or more of the carbon black has an average particle size of from 150 to 1,000 mμ and wherein the dry thickness of the backing layer is from 1.0 to 5.0 ξm, wherein the amount of said silicone is 3.33 wt.% or less based on the total solid content of the backing layer.

2. The magnetic recording medium as claimed in claim 1, wherein the silicone has a viscosity of from 5 to 40 CS.

3. The magnetic recording medium as claimed in claim 1, wherein the silicone has a refractive index of from 1.390 to 1.403 at 25° C. and a specific gravity of from 0.900 to 0.965 at 25° C.

4. The magnetic recording medium as claimed in claim 1, wherein said silicone is linear or cyclic polysiloxane selected from the group consisting of cyclic dimethyl polysiloxane, methyl phenyl polysiloxane, diphenyl siloxane, dialkyl polysiloxane and derivatives thereof having a molecular weight of 4,000 or less.

5. The magnetic recording medium as claimed in claim 4, wherein said silicone is linear or cyclic polysiloxane selected from the group consisting of cyclic dimethyl polysiloxane, methyl phenyl polysiloxane, diphenyl siloxane, dialkyl polysiloxane and derivatives thereof having a molecular weight of from 500 to 4,000.

6. The magnetic recording medium as claimed in claim 1, wherein said silicone is used in an amount of from 0.01 to 2 wt% based on the amount of the non-magnetic particles.

7. The magnetic recording medium as claimed in claim 6, wherein the amount of said silicone is 1.33 wt.% or less based on the total solid content of the backing layer.

8. The magnetic recording medium as claimed in claim 1, wherein 50 wt% or more of the carbon black has an average particle size of from 150 to 1,000 m$\mu$.

9. The magnetic recording medium as claimed in claim 1, wherein 25 wt% or more of the carbon black has an average particle size of from 150 to 500 m$\mu$.

10. The magnetic recording medium as claimed in claim 9, wherein 50 wt% or more of the carbon black has an average particle size of from 150 to 500 m$\mu$.

11. The magnetic recording medium as claimed in claim 1, wherein the average particle size of the total carbon black in the backing layer is from 20 to 1,000 m$\mu$.

12. The magnetic recording medium as claimed in claim 1, wherein said non-magnetic particles other than the carbon black have an average particle size of 10 $\mu$m or less.

13. The magnetic recording medium as claimed in claim 12, wherein said non-magnetic particles other than the carbon black have an average particle size of from 0.5 to 0.001 $\mu$m.

14. The magnetic recording medium as claimed in claim 1, wherein the weight ratio of the non-magnetic particles to the binders is from 300/100 to 40/100.

15. The magnetic recording medium as claimed in claim 14, wherein the weight ratio of the non-magnetic particles to the binders is from 200/100 to 50/100.

16. The magnetic recording medium as claimed in claim 1, wherein a dry thickness of the backing layer is from 1.5 to 2.5 $\mu$m.

17. The magnetic recording medium as claimed in claim 1, wherein said binder is selected from the group consisting of thermoplastic resins, thermosetting resins, reactive type resins and mixtures thereof.

18. The magnetic recording medium as claimed in claim 17, wherein said binder is selected from the group consisting of resins containing 20 wt.% or more of at least an epoxy resin or polyurethane.

19. The magnetic recording medium as claimed in claim 18, wherein said binder is selected from the group consisting of polyurethane and a mixed resin mainly composed of polyurethane.

20. The magnetic recording medium as claimed in claim 1, wherein said support has a thickness of from 3 to 100 $\mu$m.

21. The magnetic recording medium as claimed in claim 20, wherein said support has a thickness of from 4 to 50 $\mu$m.

22. The magnetic recording medium as claimed in claim 1, wherein said magnetic layer has a thickness of from 0.5 to 10 $\mu$m.

23. The magnetic recording medium as claimed in claim 22, wherein said magnetic layer has a thickness of from 1 to 6 $\mu$m.

* * * * *